United States Patent [19]

Rastegar et al.

[11] Patent Number: 4,977,498
[45] Date of Patent: Dec. 11, 1990

[54] DATA PROCESSING SYSTEM HAVING A DATA MEMORY INTERLOCK COHERENCY SCHEME

[75] Inventors: Joseph Rastegar, Newton; Anne S. Valiton, Westboro, both of Mass.

[73] Assignee: Digital Equipment Corporation, Maynard, Mass.

[21] Appl. No.: 176,785

[22] Filed: Apr. 1, 1988

[51] Int. Cl.⁵ .................... G06F 12/12; G06F 12/14
[52] U.S. Cl. .................... 364/200; 364/900; 364/243.4; 364/243.41; 364/246.8; 364/238.4; 364/964.2; 364/969.2; 364/968
[58] Field of Search .................... 364/200, 900

[56] References Cited

U.S. PATENT DOCUMENTS

| | | | |
|---|---|---|---|
| 4,513,367 | 4/1985 | Chan et al. | 364/200 |
| 4,622,631 | 11/1986 | Frank et al. | 364/200 |
| 4,775,955 | 10/1988 | Liu | 364/900 |
| 4,885,680 | 12/1989 | Anthony et al. | 364/200 |
| 4,912,630 | 3/1990 | Cochcroft, Jr. | 364/200 |

Primary Examiner—Michael R. Fleming
Assistant Examiner—Gopal C. Ray
Attorney, Agent, or Firm—Kenyon & Kenyon

[57] ABSTRACT

This invention is directed to a memory system that determines which blocks of a set of associative blocks in cache memory are unavailable for replacement. This is accomplished by operating the memory system to maintain a duplicate set of tags which track block ownership for this cache pursuant to a "snoopy" protocol. In addition, the cache system maintains a bit associated with each memory address to indicate whether any data blocks resident in it have been locked. The interlock status of the data blocks in the cache is not communicated to the memory system. Once a block is locked, it cannot be allocated for replacement until it is unlocked. When the cache system encounters a locked block, it skips over that block and allocates the next block of the associative blocks. From this, the memory system infers, by means of a replacement algorithm, that block is being locked and, therefore, cannot be replaced. This enables the memory system to implement an irregular replacement policy for this cache when the block to be replaced is owned and locked.

13 Claims, 4 Drawing Sheets

FIG. 4

```
 33                                    9 8 7 6      0
┌────────────────────────────────────┬─┬─┬─┬────────┐
│              LABEL                 │ │ │ │        │
└────────────────────────────────────┴─┴─┴─┴────────┘
                                      │ │ │ │
                          BLOCK SELECT (WITHIN SET)
                          BANK SELECT (ODD OR EVEN)
                          BYTE STYLE (WITHIN BLOCK)
```

FIG. 5

```
    27 26 25 24                                      0
  ┌─┬─┬───┬────────────────────────────────────────┐
  │P│I│ ST│                 TAG                    │
  └─┴─┴───┴────────────────────────────────────────┘
  29 28  27  STATE                                 26
         INTERLOCK
       PARITY
```

| 26 | 25 | STATE |
|----|----|----|
| 0 | X | INVALID |
| 1 | 0 | SHARED |
| 1 | 1 | OWNED |

30 ns having a data
MEMORY INTERLOCK COHERENCY SCHEME

FIELD OF THE INVENTION

The invention relates to a digital computer memory system and, more particularly, to a digital computer system including multiple central processing units, a memory system, and an I/O adapter module. The invention provides an efficient means by which a memory system determines which blocks of a set of associative blocks in a cache memory, are unavailable for replacement.

BACKGROUND OF THE INVENTION

Previously designed methods of determining which blocks of set-associative blocks in a cache memory are unavailable for replacement utilize communication between the two memory nodes to keep each node informed as to which block is being replaced. This method requires that the two nodes communicate with each other, via bus transfers, to keep the other apprised of memory block availability. By this method, neither node could exercise independent judgment on the status of memory block availability.

While the prior art provides a very adequate method of determining memory block availability, there is a need for advancement. In particular, in a high performance computer system, a major bottleneck to processing speed is bus transfers. Thus, it is imperative to minimize bus transfers to improve processing speed on a bandwidth critical bus.

SUMMARY OF THE INVENTION

The present invention provides a means by which a memory system can determine which block of set-associative blocks are unavailable for replacement in a memory cache while eliminating the need to communicate such block unavailability with bus transfers.

Generally, the present invention comprises a memory system coupled, by a bus arrangement, to an Input/Output (hereinafter "I/O") adapter module. The memory system is also coupled, by a point to point bus arrangement, to multiple central processing units (hereinafter "CPUs"), and is thereby shared between such CPUs. Furthermore, the memory system includes a central memory controller, to which the CPUs and I/O adapter are coupled. The memory controller is coupled, by a point to point bus arrangement, to a plurality of memory modules, while the I/O adapter is coupled, by a bus arrangement, to I/O devices or other memory systems. The I/O adapter and each CPU has a cache memory.

Each cache memory is operated as a "write-back" cache. A "write back" cache memory allows only for the update of the specific location of the cache memory to be written to. The main memory will thus, not have a correct copy of the written data after a write operation to such a cache memory, because a write-to-cache operation does not automatically start another write-to-main-memory operation. The written location is however, marked so that later, when the content of the written location is removed from the cache, it is copied into the main memory to update the main memory.

An important concept implemented in the memory system of the invention is that, despite having main memory and several write-back local caches, there is only one correct copy of memory data in the system. Each time either a CPU or the I/O adapter performs a read memory operation, it issues the request to the central memory controller, which then fetches the data from memory and stores it in the requesting device's cache. However, if the data in the main memory is not the latest copy for that memory location, the central memory controller locates the latest copy of memory among the CPU cache memories, and controls the memory transfer to store the correct copy of the requested data in the requesting device's cache.

The above described concept is implemented in the memory system through an "ownership" based, centralized coherency protocol. In the system, a module must request and obtain ownership of a memory location before it can perform a write operation to that location. The protocol generally requires that a memory location have only one of three states. The three states are: owned, shared and invalid. When a memory location is owned by a module, that module has the only copy of that memory location and all other copies are invalid. When a memory location is shared, the latest copy of the data in that location is found in the main memory and the various CPU's or other modules in the system have "read only" access to the data.

The central memory controller determines block ownership by maintained a duplicate set of tags, or identifiers, for all data blocks stored in the several cache memories of the system. These are stored in a duplicate TAG store.

The I/O adapter also employs an identifier bit for each tag entry of its cache memory to indicate whether any data block present in the cache has been "read-locked" by a previous device request. Each locked data block in the I/O adapter cache memory is therefore identified by a bit indicating "interlock" status.

The I/O adapter cache structure is also arranged as a set-associative cache. Set-associativity means that one memory address contains N (for example, eight) number of places in its cache that the memory address may reference.

Pursuant to the invention, a data block residing in the I/O adapter cache must be "owned" by the cache before it can be locked. Upon receiving an interlock instruction from a device, the I/O adapter requests ownership, sets the appropriate bit for the data block upon which the interlock instruction is to be performed, and then performs the required operation. At no time does the I/O adapter communicate the interlock status of any cache data blocks to the rest of the system, thereby eliminating the need for bus transfers.

Similarly, the availability of cache memory is not communicated between the memory controller and the I/O Adapter, which also reduces the need for bus transfers. This invention uses a system of pointers instead, to keep track of available memory blocks. A pointer, as used in the invention, is a data path guide to the next available memory block. The memory controller and the I/O Adapter each have an independent set of pointers which are initialized to zero to provide a common starting point. The I/O Adapter will increment pointer location first, if the current pointer location is locked. The subsequent request from the I/O Adapter to the memory controller allows the memory controller to ascertain that its own pointer location is incorrect. With this, the memory controller will increment its pointer location to match that of the I/O Adapter.

The memory controller determines that its pointer location does not match that of the I/O adapter by monitoring the write address requests of the I/O adapter's swap transfer commands and by monitoring the ownership status of each set in the set-associative cache memory by referencing the address for a particular set in its own tap store.

Upon initialization, each set of pointers assumes a starting point of set O. A swap transfer command is then issued from the I/O adapter to the memory controller. The swap transfer command contains a write address to a set in a set associative cache which is either owned or shared, and the memory controller compares that address to the address contained in its own tag store. If these two addresses match, the memory controller determines that its pointers are in the correct position and memory updating can proceed. If these two addresses do not match this is an indication that set O is locked and as a result the memory controller increments its pointers. Finally, if the swap transfer command contains a write address to a memory location which is not owned, the controller determines that this location cannot be locked and there is no need to perform any comparison.

The effect of an interlock operation is that all other devices in the memory system are prevented from accessing the locked block in the cache until the locking device completes the interlock operation.

If a data block is locked within a cache, it cannot be replaced until it becomes unlocked. When the I/O adapter encounters a locked block, it skips over that block and allocates the next available block in its set-associative cache for replacement of data. From this, the memory system infers, by means of a replacement algorithm, that the block is not only owned, but also locked and, therefore, cannot be replaced. This enables the memory system to implement an irregular replacement policy for the I/O adapter cache when the block to be replaced is owned and locked.

Accordingly, the present invention achieves a maximum efficiency and flexibility for a memory system to maintain data coherency. The present invention achieves the above while eliminating bus transfers aimed at tracking unavailable memory blocks rendered unavailable by an interlock status.

For a better understanding of the above and other features and advantages of the invention reference should be made to the following detailed description of the invention and to the accompanying drawings.

BRIEF DESCRIPTION OF THE DRAWINGS

FIG. 4 is a logical subdivision of physical addresses in the system of the invention.

FIG. 5 is a logical subdivision of physical addresses in the system of the invention which includes a state table description.

DETAILED DESCRIPTION
SYSTEM OVERVIEW

Figure 1:
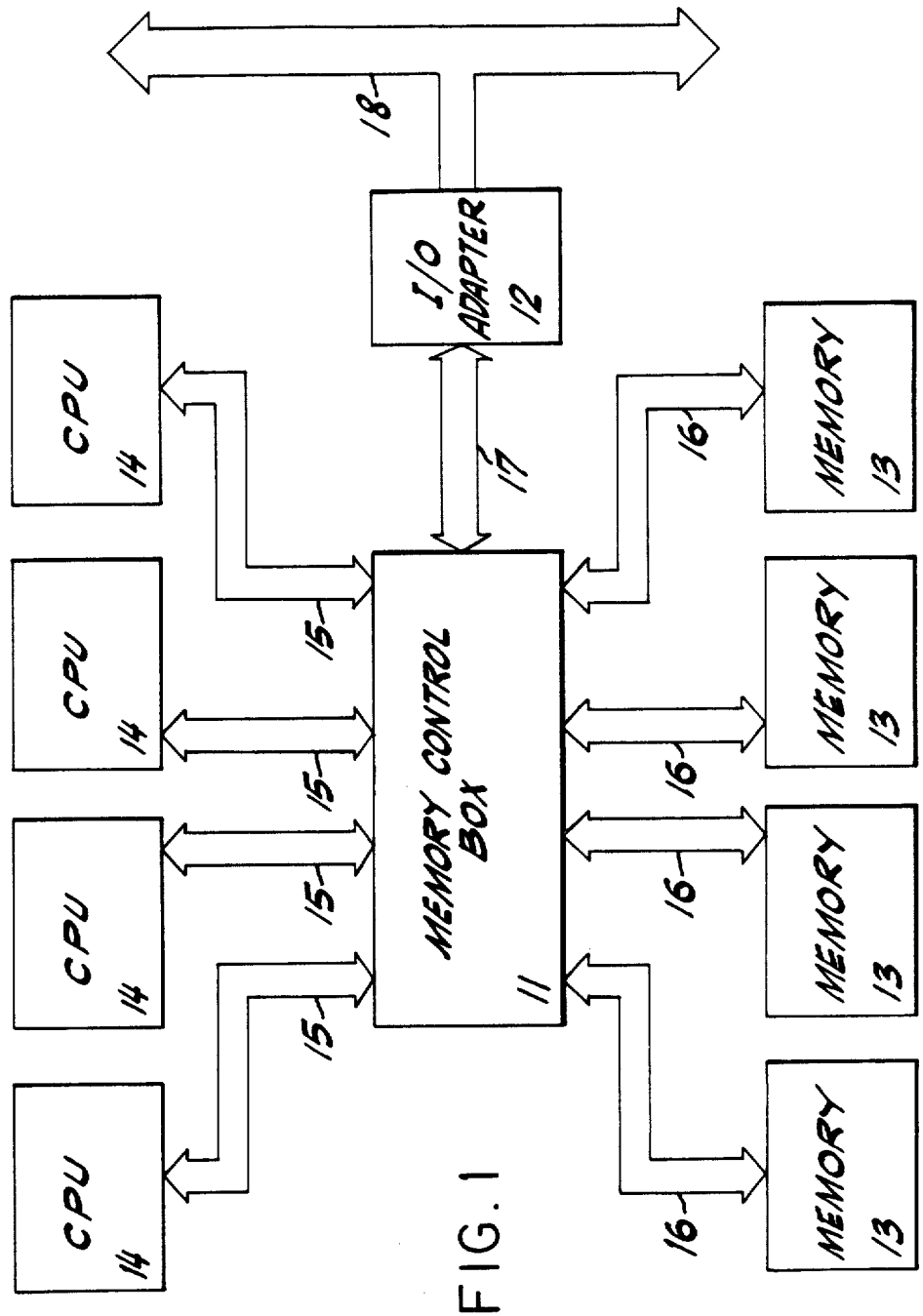
FIG. 1 is a block diagram of a computer system.

Referring now to the drawings and initially to FIG. 1, there is illustrated, in block diagram form, the system configuration according to the invention. The system 10 includes several, e.g., four, central processing units 14 coupled to a central memory controller box (hereinafter "MCB") 11. In addition to the CPUs 14, the MCB 11 is coupled to several memory modules 13 and an I/O adapter 12. A bus 15 couples each CPU 14 to the MCB 11. A bus 17 couples the I/O adapter 12 to the MCB 11. The protocol of the bus 17 is an upgraded version of the protocol of the bus 15 which is capable of handling the I/O cache structure, interrupts, I/O register accesses and extensions. A bus 16 couples each of the memory modules 13 to the MCB 11.

A bus 18 includes the protocol observed by a node on the bus, the electrical environment of the bus, the backplane, and the logic used to implement the protocol. The bus 18 can support multiple processors, multiple memory subsystems, and up to sixteen devices.

The bus 18 is a limited length, pended, synchronous bus with centralized arbitration. Several transactions can be in progress at a given time, allowing highly efficient use of bus bandwidth. Arbitration and data transfers occur simultaneously, with multiplexed data and address lines. The bus 18 supports quadword, octaword, and hexaword memory operations. In addition, the bus 18 supports longword length read and write operations to I/O space. These longword operations implement byte and word modes required by certain I/O devices.

The MCB 11 is an intelligent cross bar that connects the four CPUs 14 and the I/O system to the four available memory modules 13. It is the responsibility of the MCB 11 to keep track of which CPU 14 or I/O adapter 12 has the most recent copy of any memory data in their local cache. This is accomplished by having duplicate TAG stores in the MCB 11. These duplicate tag stores track block ownership for each cache in the system. In addition to supplying requested data to the CPUs 14 and the I/O adapter 12, the MCB 11 is the focal point for the interrupts generated by the CPUs 14 (Interprocessor Interrupts) and interrupts generated by the I/O adapters 12 (Device Interrupts). The MCB 11 channels all the I/O space transactions generated by the CPUs 14 that do not fall within the 32 Mbytes allocated for the MCB 11 and the memory array modules 13 (the last Mbytes of the I/O space) to the I/O adapter 12.

The I/O adapter 12 is the interface module that connects the MCB 11 to bus 18. Its major functions are to generate DMA transactions to memory, to generate I/O transactions to the devices on bus 18, to interrupt CPUs 14, and to read interrupt vectors. The I/O adapter 12 can be any node on bus 18 that has an I/O connector through the backplane. The I/O adapter 12 can handle any number and combination of currently known bus devices that do not use a local cache.

Figure 2:
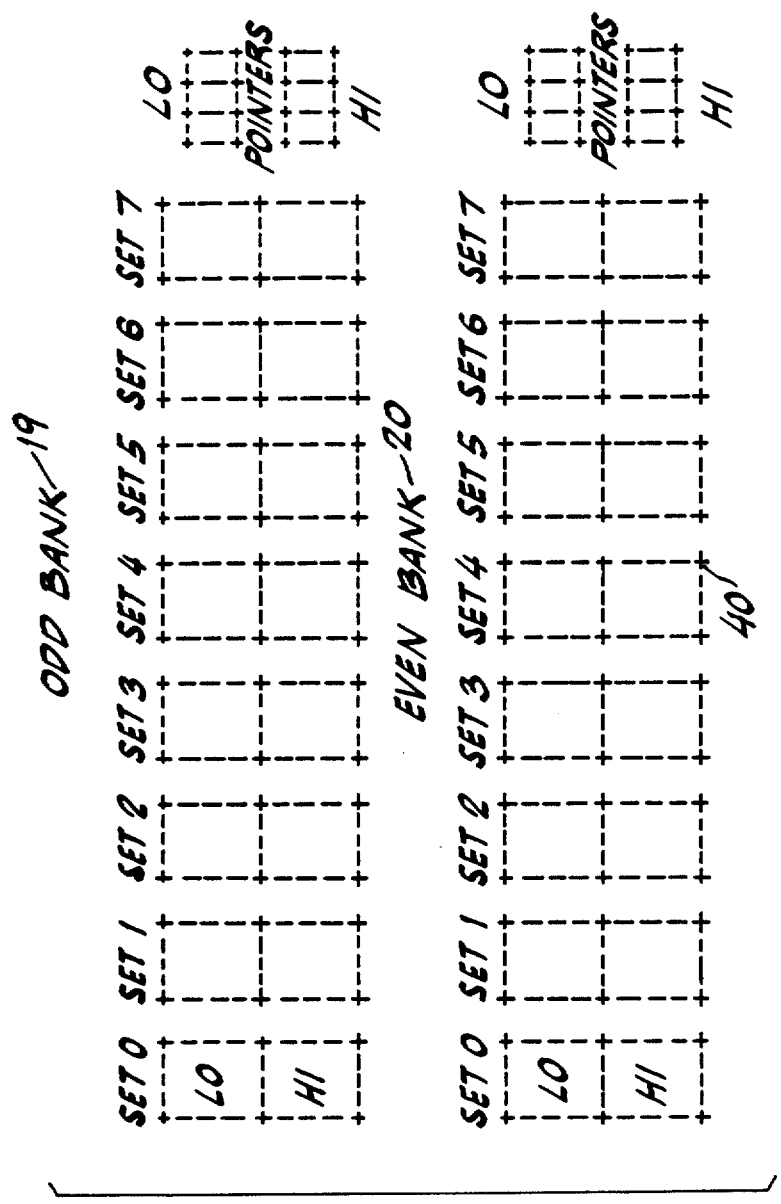
FIG. 2 is a depiction of the I/O Adapter cache structure.

The I/O adapter cache 40 is a buffer for data transferred between the main memory 13 and bus 18. Refer to FIG. 2 for a delineation of the I/O adapter cache 40 structure. The total size of the cache 40 is 4 Kbytes. The cache 40 consists of two banks, the size of each bank being 256×64 bits. The blocks of data (128 bytes) are interleaved among the two banks. One bank stores all even blocks 20 (bit 7 of the address field clear), the other stores all odd blocks 19 (bit 7 of the address field set). Each bank is further divided into 1 Kbyte, referred to in FIG. 2 as LO and HI. Access to the cache 40 blocks is controlled by four, 3 bit, HI and LO pointers 21 to each cache bank. Any read or write performed by this cache 40 to memory 13 is done by block, therefore, each block has an associated tag entry.

Each bank of the I/O adapter's cache 40 is eight set-associative. Referring again to FIG. 2 to explain set-associativity, this term means that for one memory address, the I/O adapter's cache 40 has eight separate places in its cache 40 that the memory address may reference. How the eight set-associative cache 40 is utilized pursuant to the invention will be described below.

The I/O adapter cache banks are cycled every 64ns. Together the two cache banks can supply 128 bits (16 bytes) of data every 64ns. This translates to 250 Mbyte per second raw bandwidth.

Each one of the cache banks operates independently. This allows the module to do two cache operations at any given time. For example, while one bank is supplying data to bus 18, the other bank could be busy receiving data from bus 17.

The I/O adapter cache 40 needs to have high data bandwidth to support the data traffic from bus 17 and bus 18. One bus 18 transaction could require up to three cache transactions in the I/O adapter 12. Part of the centralized coherency protocol of bus 17 is that, before a CPU 14 or an I/O device can write any data into its cache, that block of data has to be owned by the module. In order for the module to become the owner of the block, the module has to read the block from the MCB 11 with the intention of becoming the owner and then change a portion of or all of the block. If a modified block of data resides in the cache at the same location where a new block of data is to be placed, then the modified block must be first written back to main memory located in memory module 13. This is accomplished by doing a swap transaction on bus 17 (write the previously updated data into memory and read the new block). It takes two cache transactions to bus 17 before any data can be written from bus 18 into the cache if the block of data is not in the cache and the old block in the cache was modified.

The centralized coherency protocol on bus 17 is needed to keep the data coherent in the system of the invention. For a more detailed description of the centralized coherency protocol, reference should be made to co-pending Application Ser. No. 176428 entitled "Multi-Processor Computer System".

Each cache bank in the I/O adapter 12 has eight TAG stores associated with it. As described above, these banks are eight set-associative. The TAG stores are two locations deep. Eight comparisons are required for each tag lookup as shown in FIG. 3.

Figure 3:
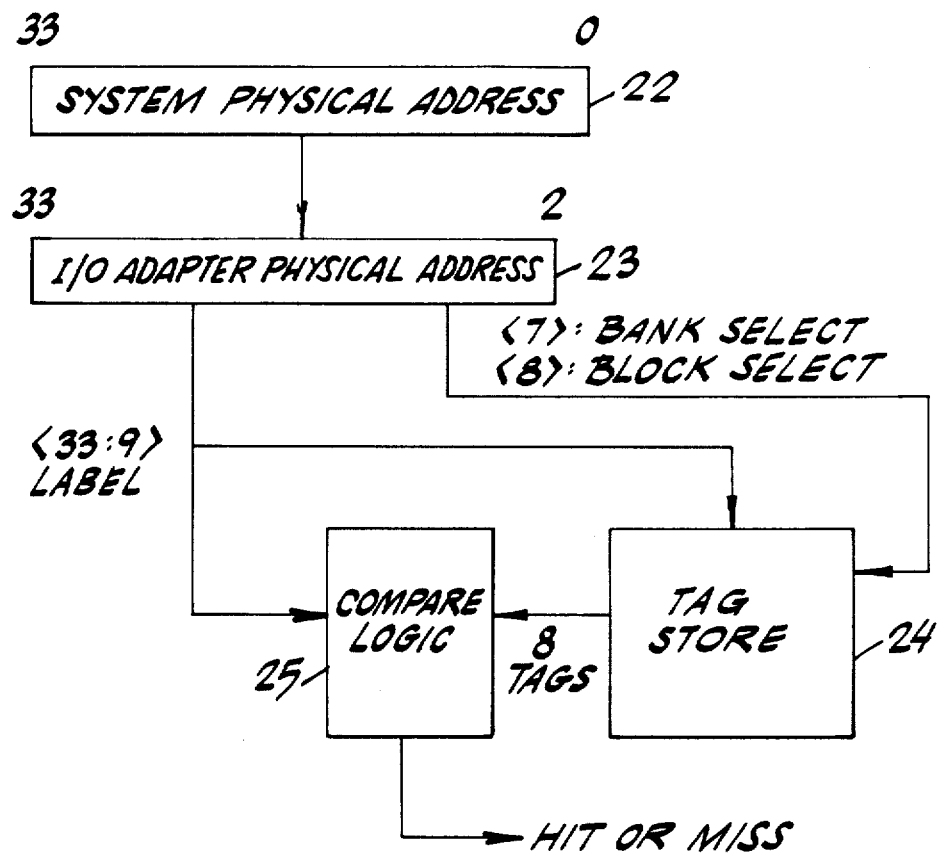
FIG. 3 is a flow diagram depicting cache memory location selection.

FIG. 3 illustrates the decode and compare flow for TAG lookup in the I/O adapter 12. As discussed above, the MCB 11 maintains a duplicate set of TAG stores for every cache in the system to track ownership pursuant to the centralized coherency protocol. Pursuant to the invention, the devices coupled to the bus 18 generate thirty four bit addresses 22 which are sent to the I/O adapter 12. FIG. 4 shows how the I/O adapter 12 receives it as a thirty four bit address in which bits <33:9> are a label, bit <8> is block select (within a set), bit <7> is bank select and bits <6:0> are the byte select within a block. Once the correct tag is located, it is then compared to the label resulting in either a hit, i.e., a valid location is found, or a miss, i.e., the location is invalid or unavailable.

When bits <33:29> are set, I/O space is referenced. No I/O space reference is ever stored in the cache. When the reference is in memory space, bit <8> points to eight entries within a bank and bit <7> selects one of the two banks. Each entry in cache contains tag and data information and is organized as shown in FIG. 5.

Pursuant to the centralized coherency protocol, a memory block in cache can be in three states. State 27 is indicated by bits <26:25> as shown in FIG. 5. The first, invalid, means that the requested memory block is not in the cache. The shared state indicates that the memory block is in cache but is owned by the memory, not the cache. The last possible state is owned which means that the memory block is in the cache, is owned by this cache, no other cache has this block, and the memory copies in modules 13 may be outdated. Ownership of a block is required before a module can write to the data block.

Moreover, the instruction set of the I/O adapter 12 and I/O devices include atomic operations. An atomic operation is comprised of two or more commands which collectively perform a task. Such operations are mutually exclusive to all other operations in that once an atomic operation is initiated upon specific memory locations, all other operations to these locations are prevented. An example of an atomic operation is a "read lock, write unlock". For a "read lock, write unlock" operation, a read lock command is issued by a device to a specific memory block. Until the same device issues a write unlock command to the same memory block, all other devices are prevented from accessing that memory block. Such atomic operations are collectively referred to as interlock transfers. These operations are utilized by the I/O devices primarily for software synchronization, vis-a-vis, all the I/O devices and the cache memory of the I/O adapter 12. When device A wants to guarantee that after it reads a memory location no other device can access that same memory location before device A writes it, it will utilize an interlock operation. Upon the issuance of the "write unlock", the memory location is unlocked and any other device may then access the memory location.

"Read lock, write unlock" operations can occur on bus 18 from an I/O device to a data block residing in the cache 40 of the I/O adapter 12. There is no indication of interlock transfers on bus 17. Thus, only the I/O adapter 12 is aware of the interlock transfers and no information regarding the interlock is sent to the MCB 11. All other transfers within the system use the previously described centralized coherency protocol for cache coherency throughout the system.

The assertion of the interlock bit 28 (bit <27> in FIG. 5) in a tag entry in the tag stores, resident on the I/O adapter 12, indicates that a read interlock operation is being performed to an address within a specific block. Other read interlock operations to this block will be rejected by the "lock" response when this bit is set. This bit gets cleared by a write unlock operation performed to any address within the locked block, therefore, "read lock, write unlock" is functionally one operation. This block must be owned by the I/O adapter 12 before an interlock operation can be executed. Thus, a major feature of the invention is achieved through the use of the centralized coherency protocol to implement the interlock operation throughout the memory system without communicating the interlock status to the MCB 11.

Interlocked variations of read commands are intended to do the same thing as the regular reads, but they also invoke a mutual exclusion mechanism. Interlock reads cause the setting of an interlock flag 28 associated with the location in the tag store of the I/O adapter 12, whereas unlock writes cause the clearing of the lock flag 28. During periods when a location is locked, subsequent interlock read operations to that location will result in the I/O Adapter 12 returning a "locked" response instead of read data.

In memory space, the read lock transactions generated by the I/O adapter 12 works like the non-interlocked versions with a bit more functionality. The I/O Adapter 12 searches the tag store for the availability of the requested data and the state of the block. The only acceptable state is "owned". If the search indicates any other state, then a bus 17 transaction will be required to change the state to "owned". The I/O adapter 12 will set the interlock flag 28 in the tag store when it passes the data to the requesting device.

The exact effect of an interlocked transaction depends o the state of the interlock flag 28 in the I/O adapter tag store. If the interlock flag 28 is already set, the I/O adapter 12 responds to a read request with a "locked response" and no data is returned. This signifies to the requesting device that the shared memory structure is not available. If the interlock flag 28 is not set, receipt of this request sets the interlock flag 28 and locks the memory to further interlocked read requests by I/O devices to the referenced location and provides the data contained in the addressed location(s) to the requester. The corresponding transaction "unlock write" is required to reset the interlock flag 28. The interlocked read transaction is used to gain access to a shared object in memory.

If MCB 11 requests, pursuant to a CPU 14 transaction, a block that is locked by the I/O adapter 12, the I/O adapter 12 will return a "busy" response. This response is utilized to avoid deadlock situations.

Unlike the CPUs 14, the I/O adapters 12 could execute normal read and write operations in the middle of read lock and write unlock operations. The I/O adapter 12 has to reserve some of the cache blocks to service normal reads and writes to avoid any deadlock situation. Pursuant to a feature of certain embodiments of the invention, to help reduce the logic required on the MCB 11 for the replacement algorithm (described below), the I/O adapter 12 allows up to two interlock flags 28 to be set within a subset in each bank at any given time. A "locked" response is returned to the requester of a read lock transaction if two of the blocks within a subset of a bank are locked. This provides a maximum of eight interlock flags 28 being set in the I/O adapter 12 at any given time.

Replacement Algorithm

The I/O adapter cache 40 uses a first in, first out algorithm (the block that was most recently replaced will be the last one in the set to be replaced again) to select which one of the eight sets within a cache bank will store the block of data that was requested from bus 17. The I/O adapter 12 requests to read a block of data from the MCB 11 due to a transaction on bus 18. The block of data coming from the MCB 11 has to be stored in the cache 40. The block received from the MCB 11 is kept in the local cache 40 as long as possible, since other transactions on bus 18 may require access to the same block of data in the cache 40. The transactions on bus 18 that address the memory space are normally quadword or octaword long and the size of each cache block is 128 bytes.

The I/O adapter cache 40 uses a total of four, three-bit pointers 21 to keep track of which block of the cache 40 should be allocated for the next block transfer from the MCB 11. Each cache bank has two pointers assigned to it. One pointer is used for low blocks within a set, and the other pointer is used for the high block within the set. Address bit <8> specifies which one of these pointers will get used. Address bit <7> selects the bank (odd or even). Therefore, decoding of address bits <8:7> selects one of the four pointers. Each individual pointer selects one of the eight blocks in its set. The pointer that was used for the allocation gets incremented before it gets used for block allocation again. All the pointers are initialized to zero.

The exception to the above algorithm and an important feature of the invention is when a block is owned (bits <26:25> in FIG. 5) and the interlock flag 28 (bit <27> in FIG. 5) is set, this block cannot be replaced until the interlock flag gets cleared by a write unlock transaction on bus 18. Referring to FIG. 2 to explain the use of the interlock operation, pursuant to the invention, the I/O adapter 12 receives a request from an I/O device and its cache pointer 21 is initially pointing to SET0. The I/O adapter 12 examines its entire cache 40 to ascertain if the data block requested is resident in its cache 40. Assuming the block is not there, this generates a "cache miss" and the I/O adapter 12 must request the block from main memory 13, through the MCB 11. If the location was owned by the I/O adapter 12, a "swap" transfer is initiated to write the present contents of the location and read in the block requested by the I/O device. The MCB 11 maintains its own copy of the I/O adapter cache pointers, so it knows that the pointers were pointing to SET0. Its pointers are maintained independently from the I/O adapter's pointer and are controlled by the transfers across bus 17. The MCB 11 will then transfer the block to SET0 of the cache and increment its pointers and update its TAG store.

An important feature of the invention is utilized when an I/O device makes a request to the I/O adapter 12 which results in a cache miss and SET0 is owned and locked by a previous read interlock operation. The I/O adapter pointers 21 are pointing to SET0, which is owned and locked, and the block cannot be released, i.e., written back to memory via a "swap" transfer, otherwise the interlock transfer would be violated. Therefore, before the block in SET0 can be replaced, the I/O adapter 12 must receive a write unlock. The implementation of the I/O device requests without violating the interlock transfers is referred to as interlock coherency.

According to the invention, when the I/O adapter 12 comes across a block in its cache 40 that is owned and locked, it will not use it. Rather than to halt processing until a write unlock command is issued, it will increment its pointer to look to the next set, in its set-associative cache, to see if it is available for replacement. If the next set is also owned and locked, the pointer is incremented to the next location.

When the I/O adapter 12 reads the next set it could either be owned or shared. If the set is shared, the I/O adapter 12 simply requests the new block from memory. If it is owned, the I/O adapter must perform a swap operation as described above.

The MCB 11 independently maintains its own set of I/O adapter cache pointers. When the I/O adapter pointers are incremented to point to SET1, the duplicate pointers, resident on the MCB 11, point to SET0. Based on the request from the I/O adapter 12 and the information stored in the MCB's 11 TAG store, the MCB 11 is able to deduce that SET0 is locked and it adjusts its copy of the I/O adapter pointers to SET1.

The MCB 11 accomplishes this feature of the invention by looking up the TAG for SET0. If it is owned, the MCB 11 compares the write address of the swap transfer from the I/O adapter 12 with the address stored in its TAG store for SET0. If they match, the MCB 11 knows that it has the correct memory location for updating. If they don't match the MCB 11 realizes that SET0 is locked and the I/O adapter has incremented its pointers to SET1. The MCB 11 will then increment its pointers to SET1. At this point, SET1 could either be owned or shared. If SET1 is shared, therefore it cannot be locked, MCB 11 does not do a compare, and simply uses its pointer for replacement. If SET1 is owned, MCB 11 repeats the above described procedure until it finds a match. Thus, the invention enables this interlock coherency to be maintained throughout the memory system independently, without performing additional operations on bus 17.

The above described preferred embodiment of the invention is meant to be representative only, as certain changes may be made therein without departing from the clear teachings of the invention. Accordingly, reference should be made to the following claims which alone define the invention.

What is claimed is:

1. A method of operating a device having a set-associative cache memory structure and a first pointer system to track set locations in said set-associate cache memory structure that are available for replacement, the device being coupled to a memory controller, the memory controller having a second pointer system to independently track said set locations available for replacement in said set-associative cache memory structure, comprising the steps of:
   (a) operating said device to assert a data lock condition for a preselected set location of said set-associative cache memory structure;
   (b) utilizing the first pointer system to locate a next available set location for replacement in said set-associative cache memory structure;
   (c) utilizing the second pointer system to locate said next available set location;
   (d) incrementing said first pointer system to point to another next available set location of said set-associative cache memory structure when said next available set location pointed to by said first pointer system is said preselected set location;
   (e) independently incrementing said second pointer system in said memory controller from said next available set location to said another next available set location, subsequent to said incrementing of said first pointer system by:
      (i) issuing a data transfer command including a memory address to a data block stored in said another next available set location of said set-associative cache memory structure, the data transfer command being issued from said device to said memory controller,
      (ii) operating said memory controller to store a corresponding memory address for each respective data block stored in each respective set location in said set-associative cache memory structure,
      (iii) operating said memory controller to compare said memory address in said command, and an address stored in said memory controller in respect of said next available set location to determine a mismatch; and
      (iv) incrementing said second pointer system to said another next available set location when said comparing step indicates a mismatch, whereby said memory controller remotely and independently tracks the location of data within said set-associative cache memory structure.

2. A method according to claim 1, wherein said device comprises an I/O adapter module.

3. A method according to claim 2, wherein said I/O adapter is coupled to at least one operating device.

4. A method according to claim 1, further comprising the step of initializing said first pointer system and said second pointer system to a commonly designated starting set within said set associative cache structure.

5. A method according to claim 1 comprising the further step of repeating (e) (i) through (e) (iv) until a match is found between said memory address in said command and said address stored in said memory controller.

6. A method according to claim 1, comprising the further steps of:
   (a) prior to said step of asserting a data lock condition, operating each of said device and said memory controller to set an ownership status indicator to indicate owned status of said preselected set location; and
   (b) performing said comparing step in said memory controller when and only when said address stored in respect of said next available set location has said ownership status indicator set to owned status.

7. A data processing system comprising:
   (a) a device having a set-associative cache memory structure and a first pointer system to track set locations in said set-associative cache memory structure that are available for replacement, said first pointer system indicating a next available set location;
   (b) a memory controller coupled to said device and having a second pointer system to independently track said set locations available for replacement in said set-associative cache memory structure, the second pointer system pointing to said next available set location;
   (c) said device including means for indicating a lock status for a preselected set location within said set-associative cache memory structure;
   (d) said device including means for incrementing said first pointer system to another next available set location within said set-associative cache memory structure when said next available set location pointed to by said first pointer system is said first preselected set location;
   (e) said memory controller including means for incrementing said second pointer system to said another next available set location within said memory controller, subsequent to said incrementing of said first pointer system, the means comprising:
      (i) means for receiving a data transfer command from said device, said data transfer command including a memory address to a data block stored in said another next available set location;
      (ii) a tag store in said memory controller for storing a corresponding memory address for a respective data block stored in each set location in said set-associative cache memory structure;
      (iii) means for comparing said memory address in said data transfer command and a memory address in said tag store corresponding to said next available set location; and (iv) means for incrementing said second pointer system to said another next available set location within said memory controller when said means for comparing indicates a mismatch.

8. The data processing system of claim 7 wherein said device includes a tag store, including a plurality of tag entries in said tag store and an interlock bit in each of said tag entries.

9. The data processing system of claim 8 wherein the means for incrementing the location of said first pointer system comprises:
   (a) a tag entry comprises of a memory address to be written to, said memory address having an interlock bit as one of a plurality of bits;
   (b) means for determining if said interlock bit is set in said tag entry of said memory address to be written to; and
   (c) means for incrementing said first pointer system to said another next available memory set in said set associative cache when said interlock bit is set.

10. The data processing system of claim 8 wherein said device comprises an I/O adapter module.

11. The data processing system of claim 10 wherein said I/O adapter is coupled to at least one operating device.

12. The data processing system of claim 11 wherein the I/O adapter further comprises:
   (a) a memory cache comprising an odd bank and an even bank, the odd bank and even bank further divided into a low block and a high block; and
   (b) means for directing data blocks to preselected sets in said set-associative cache memory, the means comprising:
      (i) said first pointer system, said first pointer system having four, three-bit pointers,
      (ii) a plurality of bits in each first tag entry, and
      (iii) a bit detection means for determining the bank and block selection within said preselected within said preselected memory set of said set-associative cache memory structure.

13. A data processing system comprising:
   (a) a device having a set-associative cache memory structure and a first pointer system to track set locations in said set-associative cache memory structure that are available for replacement, said first pointer system indicating a next available set location;
   (b) a memory controller coupled to said device and having a second pointer system to independently track said set locations available for replacement in said set-associative cache memory structure, the second pointer system pointing to said next available set location;
   (c) said device including means for incrementing said first pointer system to another next available location within said set associative cache memory structure when a preselected event precludes the replacement of a data block stored in said available set location;
   (d) said memory controller including means for incrementing said second pointer system to said another next available set location within said memory controller, subsequent to said incrementing of said first pointer system, the means comprising:
      (i) means for receiving a data transfer command from said device, said data transfer command including a memory address to a data block stored in said another next available set location;
      (ii) a tag store in said memory controller for storing a corresponding memory address for a respective data block stored in each set location in said set associative cache memory structure;
      (iii) means for comparing said memory address in said data transfer command and a memory address in said tag store corresponding to said next available set location; and
      (iv) means for incrementing said second pointer system to said another next available set location within said memory controller when said means for comparing indicates a mismatch.

* * * * *